United States Patent [19]
Davenport

[11] Patent Number: 5,257,586
[45] Date of Patent: Nov. 2, 1993

[54] METHOD AND APPARATUS FOR FEEDING TO A ROTARY DEVICE

[76] Inventor: Ricky W. Davenport, P.O. Box 52154, Lafayette, La. 70505-2154

[21] Appl. No.: 841,834

[22] Filed: Feb. 26, 1992

[51] Int. Cl.⁵ ................................. F23G 5/00
[52] U.S. Cl. .................. 110/246; 110/101 R; 110/267; 414/149; 432/109
[58] Field of Search ............. 110/246, 226, 267, 274, 110/101 R, 327; 414/149; 432/109

[56] References Cited

U.S. PATENT DOCUMENTS

| | | | |
|---|---|---|---|
| 1,813,061 | 7/1931 | Lindhard. | |
| 2,002,972 | 5/1935 | Avnsoe | 222/7 |
| 2,195,815 | 4/1940 | Hanna | 83/52 |
| 3,180,501 | 4/1965 | Oberndorfer | 214/21 |
| 3,357,689 | 12/1967 | Arnesen et al. | 414/149 |
| 3,542,217 | 11/1970 | Deynat | 214/18 |
| 4,435,081 | 3/1984 | Del Fabbro | 366/18 |
| 4,850,290 | 7/1989 | Benoit et al. | 110/346 |
| 4,870,911 | 10/1989 | Chang et al. | 110/246 |
| 4,930,965 | 6/1990 | Peterson et al. | 414/149 |
| 4,969,407 | 11/1990 | Benoit et al. | 110/346 |

OTHER PUBLICATIONS

"Cement Kilns 1990" pp. 14-23 El Digest, Jun. 1990 edition, by Jeffrey D. Smith.

*Primary Examiner*—Edward G. Favors

[57] ABSTRACT

An apparatus for delivering material to the interior of a kiln to be burned therein which includes a feeding mechanism which rotates with the kiln within a stationary transfer means or drum, means for delivering material to be burned to the interior of the transfer drum, said feeding mechanism including means for collecting material from the transfer drum as it rotates and said feeding mechanism including means for compressing, shredding in some applications and delivering the material to the interior of the kiln.

37 Claims, 8 Drawing Sheets

METHOD AND APPARATUS FOR FEEDING TO A ROTARY DEVICE

BACKGROUND OF THE INVENTION

1. Field of the Invention

The present invention relates to an improved method and apparatus for burning hazardous waste in a rotary device such as a rotary cement kiln and to the improved method and apparatus for feeding materials to a rotating cylinder process.

The apparatus and feeding system disclosed herein are applicable to any situation where a need exists to feed material into a rotating cylinder at a point intermediate its ends in a continuous and controlled manner. Rotary industrial furnaces such as cement kilns, aggregate kilns, lime kilns, pulp and paper recovery kilns and incinerators may utilize the feeding system to transfer fuel material into the furnace at strategic locations which may enhance the manufacturing process or permit the utilization of fuel grade materials which heretofore was not possible. The application of the feeding system is not, however, restricted to the feed of fuel grade material alone. The system is equally capable of metering raw material or chemical additives into rotating cylinders at desired strategic locations. Kiln dust, fly ash and many other raw materials can be beneficially utilized by the continuous introduction of such materials directly into the calcining zone of a cement kiln. Horizontal rotary reactors and misers utilized in the chemical industry can use the feeding system to introduce chemical additives at strategic steps in the reaction process.

The range of application for the improved rotary kiln feeding apparatus disclosed herein is quite broad. The preferred embodiment disclosed, however, is specifically designed to be utilized by cement kilns and aggregate kilns in the feeding and burning of waste material as a means of thermal destruction and energy recovery.

Cement kilns are typically large rotary furnaces that range in length between 150 and 550 feet. Typical kiln diameters range between 10 and 15 feet. They are slightly inclined from horizontal so that minerals that are fed in the upper end will slowly travel the length of the kiln and be discharged at the lower end. Kilns typically rotate between 30 and 120 revolutions per hour with 60 being a good average. The lower end of the kiln is typically equipped with a primary burner in which fuel is burned to produce a heat source having temperatures in the range of 3000 to 3500° F. A typical mineral feed stock used to make cement is composed of limestone (calcium carbonate), sand or shale (silica source), clay (alumina source) and iron ore (iron source). As much as 90% of the raw material fed can be limestone. As the minerals move through the kiln, they are slowly heated and they pass through three distinct zones. The first, or preheat zone, has mineral temperatures that range from 350 to 1500° F. The second, or calcining zone, has mineral temperatures that range from 1500 to over 2100° F. This is the point where the minerals become hot enough for the carbon dioxide to dissociate from the limestone. The resulting calcium oxide is very reactive and it begins to chemically bind with the other minerals at this point. The chemical reactions that take place in this zone are endothermic (i.e., they require heat to occur). The last and hottest zone is the sintering zone. This zone is the zone closest to the heat source, and the minerals must reach temperatures of approximately 2600 to 2700° F. in order for the final chemical reactions to occur to produce the calcium silicate material known as "clinker." The chemical reactions in this zone are exothermic (i.e., they liberate heat). Clinker is a substance similar to lava which is produced in marble-size pellets which exit the lower end of the kiln. The clinker is then cooled and ground with small amounts of gypsum to produce the product known as Portland cement.

There is a wet process and a dry process for producing cement. In the wet process, minerals are ground and slurried with water before entering the kiln. Wet kilns must evaporate the water from the minerals before preheating can occur. For this reason they are typically 450 to 550 feet in length. The calcining section is located approximately one-third of the length from the fired end, and it is typically 150 feet or more in length. Wet kilns are considered older technology and they are more energy intensive than the newer dry kiln technology. A typical wet kiln burns 5.5 million BTUs to produce a ton of clinker, while a typical dry kiln burns 4 million BTUs per ton of clinker. Wet kilns have been motivated to burn alternative fuels as a way of reducing their energy cost so that they can continue to compete with dry kilns.

Dry kilns occur in many forms. The earlier dry kilns operated in the same way as wet kilns except the minerals were introduced in dry powder form. Long dry kilns of this type are more energy efficient than wet kilns for obvious reasons. Newer dry kilns employ a vertical preheating tower prior to entry of the minerals into the kiln itself. Hot combustion gases flow from the kiln upward through the preheat tower while dry powdered minerals cascade downward. The resulting countercurrent flow of combustion gases preheats the minerals prior to entry into the kiln and, for this reason, preheater kilns have a much shorter rotary kiln in the range of 150 to 250 feet in length. In preheater kilns, the calcining zone begins at the point of entry into the rotary kiln itself. A further improvement has been made to the preheater technology by introducing hot combustion gases from a separate burner mounted in the first stage of the preheat tower. With this arrangement, calcining of the minerals begins in the preheater tower and it finishes in the kiln. Precalcining kilns represent the newest technology and they are the most energy efficient. They are the only kilns in which calcining zone temperatures in excess of the required 1800° F. are accessible from a stationary point at the riser duct connecting the kiln to the preheater tower. All other kilns achieve these temperatures within the rotating kiln itself.

Combustion gases leaving the kiln typically contain from 6 to 30% of the feed minerals as dust. Particulate emissions are typically controlled with electrostatic precipitators or fabric filters and they are often recycled back into the kiln. Some kilns use a bypass duct to divert from 5 to 30% of the kiln off-gases to a separate air pollution control system which collects dust but does not return it to the process. This is done to prevent the build-up of metal salts inside the kiln which can affect product quality.

As set forth above, cement kilns function as excellent incinerators for a number of reasons. First, temperatures inside the kiln exceed the 1800° F. determined by the Environmental Protection Agency to be necessary for complete thermal destruction. Residence time of combustion gases inside the kiln far exceed the required 2 seconds as well. The turbulent flow of alkaline mineral dust within the combustion gases flowing down the kiln provides excellent scrubbing of the gases before they are discharged to the environment. Finally, the huge mass of reactive minerals traveling down the length of the kiln chemically binds with inorganics fed and it also provides a stabilizing effect to the process as well. This means that incineration of material in cement kilns produces no residue in comparison to RCRA units which produce toxic ash that must be landfilled. Also, cement kilns burn fuel to produce a valuable commercial product while incinerators consume fuel only to destroy hazardous waste. Burning hazardous waste in cement kilns produces no net increase in emissions and in most cases emissions are reduced because of the lower content of sulfur and other chemicals in the waste. In comparison, incineration represents a net increase in emissions to the atmosphere.

The role of the cement industry in the thermal destruction of liquified hazardous waste has long been recognized. Most hazardous organic liquids are now burned as fuel in cement kilns as a means of reducing energy cost and as an income producer. In 1990, the cement industry consumed approximately 300 million gallons of liquid hazardous waste. The generation of fuel grade liquid hazardous waste is expected to increase substantially within the next 3 to 5 years but the industry already has adequate capacity to handle the increases. The success of thermal destruction of liquid hazardous waste in cement kilns is well proven and the industry has effectively captured this market from the RCRA incinerators. The next market opportunity for cement kilns is burning organic sludges and solids that heretofore has been the domain of the incinerators and landfills.

There are several problems, however, associated with the prior art that has deterred its widespread use. First, the prior art technology requires that waste be shredded and packed into 6 gallon pails or similar containers. This requirement causes waste processors to spend large sums of money for materials and labor to containerize material. The process is also slow and laborious and it has proven impractical to containerize large quantities of material. Second, the technology involves the injection of one or two pails into the kiln per revolution. This intermittent introduction of fuel packs results in irregular releases of energy and emissions thereby threatening the stable conditions within the kiln. The consistency of fuel quality also varies from pail to pail so that consistent combustion conditions are difficult to maintain. Finally, the technology requires the kiln to intake excess air at the front end of the kiln to ensure that there is adequate oxygen in the calcining zone to promote complete combustion of the solid fuel. This situation reduces the overall thermal efficiency of the kiln.

The feeding system of the present invention has overcome the disadvantages of the prevailing technology in a number of ways. First, the system allows for the direct feed of material into the calcining zone without the need for containerization. The system is designed to feed truck load quantities of material that has been pre-shred to a 3 to 4 inch diameter particle size. The system is equally capable of feeding shred drums (including drum metal), API separator sludge, contaminated soil, tire chips, and virtually anything that can be shred. This makes it possible to handle large quantities of bulk material that has proven impractical with the prevailing technology. The system continuously mixes the bulk material so that the properties of the fuel remain consistent throughout the feed cycle. Also the system allows the simultaneous feed of material from two sources. By feeding tire derived fuel (or any consistent Btu material) simultaneously with hazardous waste, the Btu fluctuations of the hazardous waste can be leveled to provide a constant Btu input into the kiln regardless of the type of material being utilized. This promotes consistent conditions within the kiln which are desired by the kiln operators. Also, simultaneous feeding enables Btu input into the kiln to be maintained constant even if the hazardous waste feed system in instantaneously shut down. This feature is yet another way to guarantee consistency.

Second, the system disclosed herein feeds the material into the kiln in a continuous fashion that is completely controlled by the kiln operator. This continuous, and controlled, feeding promotes steady state conditions within the kiln and consistent replacement rates in the 40% range will be easily maintained. It is also anticipated that the continuous feed will allow even heavier loading of inorganics in the waste derived fuel. The system further reduces the particle size of material fed so that the final consistency entering the kiln is extremely fine and combustion air is provided directly in proportion to the feed rate of material. These factors create optimum conditions necessary to ensure complete combustion of the fuel and the overall thermal efficiency of the kiln is preserved since excess combustion air need not be fed at the primary burner. The system is protective of human health and safety through the use of inert gas blanketing and extensive monitoring throughout. All of these factors enable the technology to handle a broad range of solids and sludge materials in a practical and environmentally sound manner.

The feed system can be furnished with additional equipment to enable the pre-processing of waste obtained directly from generators. The pre-processing system shreds and blends both drummed and bulk waste to produce a consistent fuel suitable for feeding into the kiln. Even liquids and sludges can be blended with solids to produce a type of "mud" suitable for feeding. With this system, waste can be routed directly to the kiln without the need for other facilities to process and blend the waste. Without the pre-processing system, the feed unit is dependent upon other facilities to pre-process the material prior to arrival on site.

2. Brief Description of Related Art

Cement kilns used in the production of cement are quite large with typical cylinders being between 250 and 750 feet long and up to 25 feet in diameter. They are tilted slightly and rotate slowly. They have been approved and have been used for the burning liquid hazardous waste. A good summary of the state of the industry with respect to the use of hazardous waste for fueling cement kilns is the article entitled "Cement Kilns 1990" published in *Environmental Information Digest*, June 1990, pages 14 to 23.

U.S. Pat. No. 2,002,972 discloses an apparatus for making portland cement and is directed to conducting the cement mixture through piping extending around the rotating cylinder and positioned to scoop up the mix and allow it to pass through the piping and be discharged into the interior of the rotating cylinder and this structure prevents back firing from the kiln into the hopper. The kiln is fired by a gas, oil or coal burner which discharges hot gases into the discharge end of the rotating cylinder.

Other examples of rotary kilns and rotary feeders and crushers are disclosed in U.S. Pat. Nos. 1,813,061, 2,195,815, 3,180,501 and 3,542,217.

U.S. Pat. No. 4,435,081 discloses a concrete mixing plant with elevator wheels which includes a rotating drum having feeding means for cement and aggregates and an elevator wheel suitable for premixing aggregates.

U.S. Pat. No. 4,870,911 discloses a method and apparatus for waste disposal including a rotating kiln into which the waste material is discharged by a screw feeder and heat is provided by the plasma torch mounted in the gas outlet duct. The mounting shaft for the rotating kiln is hollow so that materials may be introduced or taken from the interior of the kiln.

U.S. Pat. Nos. 4,850,290, 4,930,965 and 4,969,407 disclose method and apparatus for the disposal of solid hazardous waste by packaging the solid waste in sealed containers which are delivered into the rotary kiln as fuel modules.

SUMMARY

The present invention is directed to apparatus and methods of delivering material, such as solid hazardous waste, on an intermittent bases and metering such material in a continuous and controlled manner into the interior of a rotating kiln of a cement kiln without creating any back fire hazards. The delivery apparatus includes a screw feeder and a transfer means. The screw feeder is attached to the rotating kiln cylinder and revolves with it. The transfer means is a stationary circular cylinder within which the screw feeder revolves or a stationary plate through which material is transferred to the screw feeder as it passes the plate. Solid waste material is metered into the transfer drum at a controlled rate. The screw feeder includes an inlet chute and storage bin that travels around the circumference of the transfer drum. The waste material is transferred into the screw feeder via the inlet chute which acts as a scoop as the assembly rotates through the lower section of the transfer drum. The screw feeder is both a shredder and a feed device. The apparatus is capable of feeding both solid and sludge material and with certain variations may be used to feed liquids as well.

An object of the present invention is to provide an improved method and apparatus for the use a solid waste material as a secondary fuel introduced at an intermediate point, such as the calcining zone, for a cement kiln.

Another object is to provide an improved method and apparatus for the use of material as fuel for a cement kiln which does not require containerizing or pre-packaging of such material prior to feeding.

A further object is to provide an improved method and apparatus for use of solid waste material as fuel for a rotary kiln which does not require preshredding of the solid material before feeding to the fuel delivery system.

Another object of the invention is to provide an improved method and apparatus for the feed of material into a rotary kiln without the need to containerize or package such material prior to feeding.

Another object of the invention is to provide an improved method and apparatus for the feed of solid waste material into a cement kiln which does not require pre-shredding or pre-processing of the solid material prior to introduction to the fuel delivery system.

A still further object of the invention is to provide apparatus and method of supplying a constant energy input into a rotary kiln by utilizing and controlling two or more simultaneous feeds of materials and blending such materials by the fuel delivery system so that a constant heat input into the kiln results.

BRIEF DESCRIPTION OF THE DRAWINGS

These and other objects and advantages are hereinafter disclosed and explained with reference to the drawings wherein.

DESCRIPTION OF THE PREFERRED EMBODIMENTS

Figure 1:
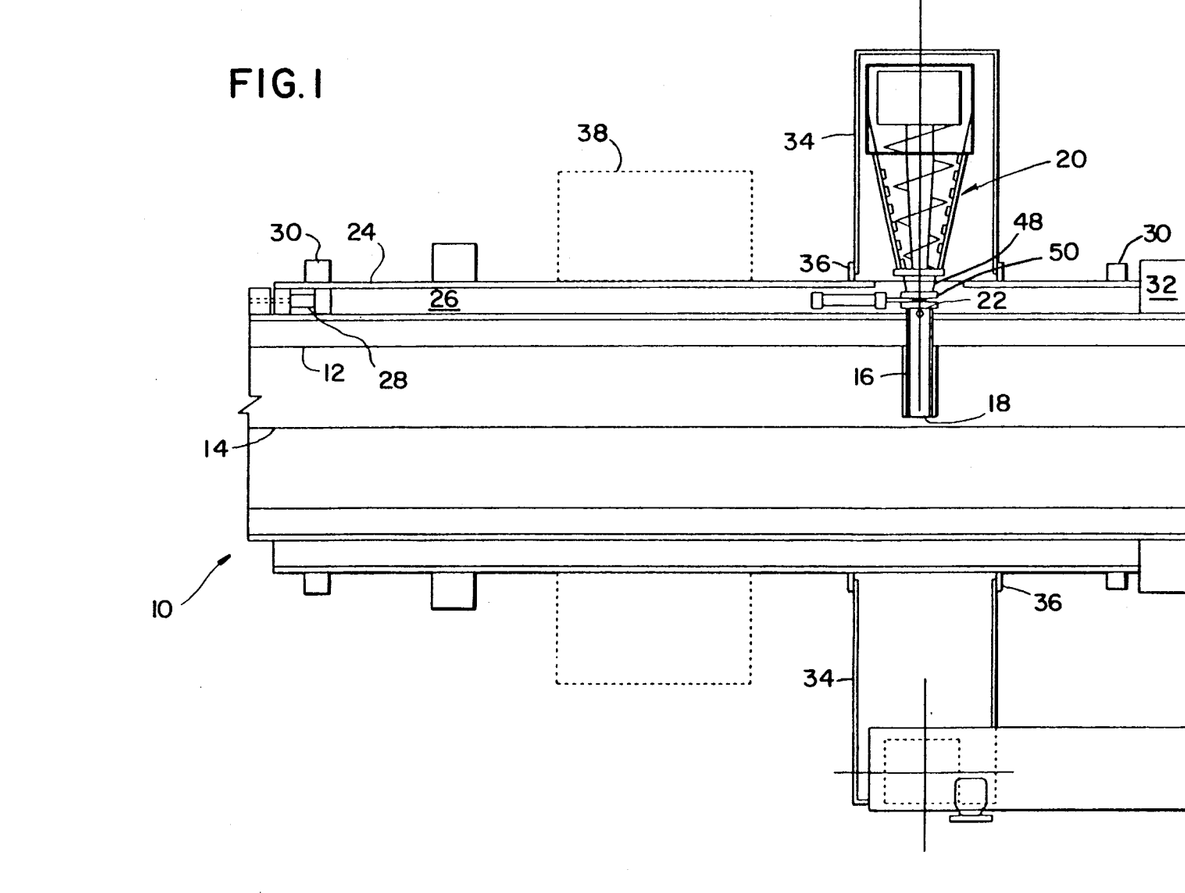
FIG. 1 is a schematic partial plan view of a rotary cement kiln having the improved solid waste feeding system of the present invention.

Referring to FIG. 1, a generally tubular kiln 10, such as a cement kiln is illustrated with an interior lining 12 of a refractory material. The typical kiln is generally tubular and is mounted and driven for rotation about its center line 14. An extrusion or discharge tube 16 is connected to the kiln 10 and extends through the wall of the kiln 10 and lining 12 into the interior of the kiln sufficiently to prevent the material being discharged in the kiln from clogging or interfering with the discharge of material from outlet 18 of the discharge tube 16. Feed mechanism 20 is detachably coupled to the inlet end 22 of discharge tube 16. Feed mechanism 20 rotates with kiln 10 and may be mounted on and supported by kiln 10. However, due to the typical structural limitations of rotating kilns, it is preferable that feed mechanism 20 be mounted on and supported by support cylinder 24. Support cylinder 24 surrounds a longitudinal portion of the kiln 10 and is preferably spaced from the exterior of the kiln to provide annulus 26 therebetween. Support cylinder 24 is connected to kiln 10 through a hydraulically operated shear pin and latching mechanism 28 so that support cylinder 24 is driven by and rotates with kiln 10. Latching mechanism 28 permits the disconnection of kiln 10 and support cylinder 24 so that each may move independently of the other if needed. Support cylinder 24 is supported by bearing saddles 30 to minimize any additional structure loading on kiln 10 by feed mechanism 20 and its related components and equipment. Annulus 26 between the interior of support cylinder 24 and the exterior of kiln 10 provides a convenient space for the flow of cooling air from plenum 32.

Feed mechanism 20 rotates with kiln 10 and support cylinder 24 within stationary transfer drum 34 which surrounds kiln 10 or support cylinder 24. Lip seals 36 are provided at the juncture between rotating support cylinder 24 and stationary transfer drum 34. Transfer drum 34 is sized to contain the rotating feed mechanism 20 and to allow for the expansion and contraction of kiln 10 and cylinder 24 as they are subjected to heating and cooling. Suitable space 38 is provided on the exterior of support cylinder 24 (or kiln 10 if cylinder 24 is not utilized) for mounting additional equipment, such as the hydraulic power unit for supplying hydraulic power to feed mechanism 20, combustion air fans and other auxiliary equipment. Power and control circuit transfer ring 40 is attached to support cylinder 24 (or kiln 10) for transferring power and control circuits from an external stationary power source to the equipment and controls rotating with kiln 10 in the manner commonly utilized with respect to existing kilns.

Figure 2:
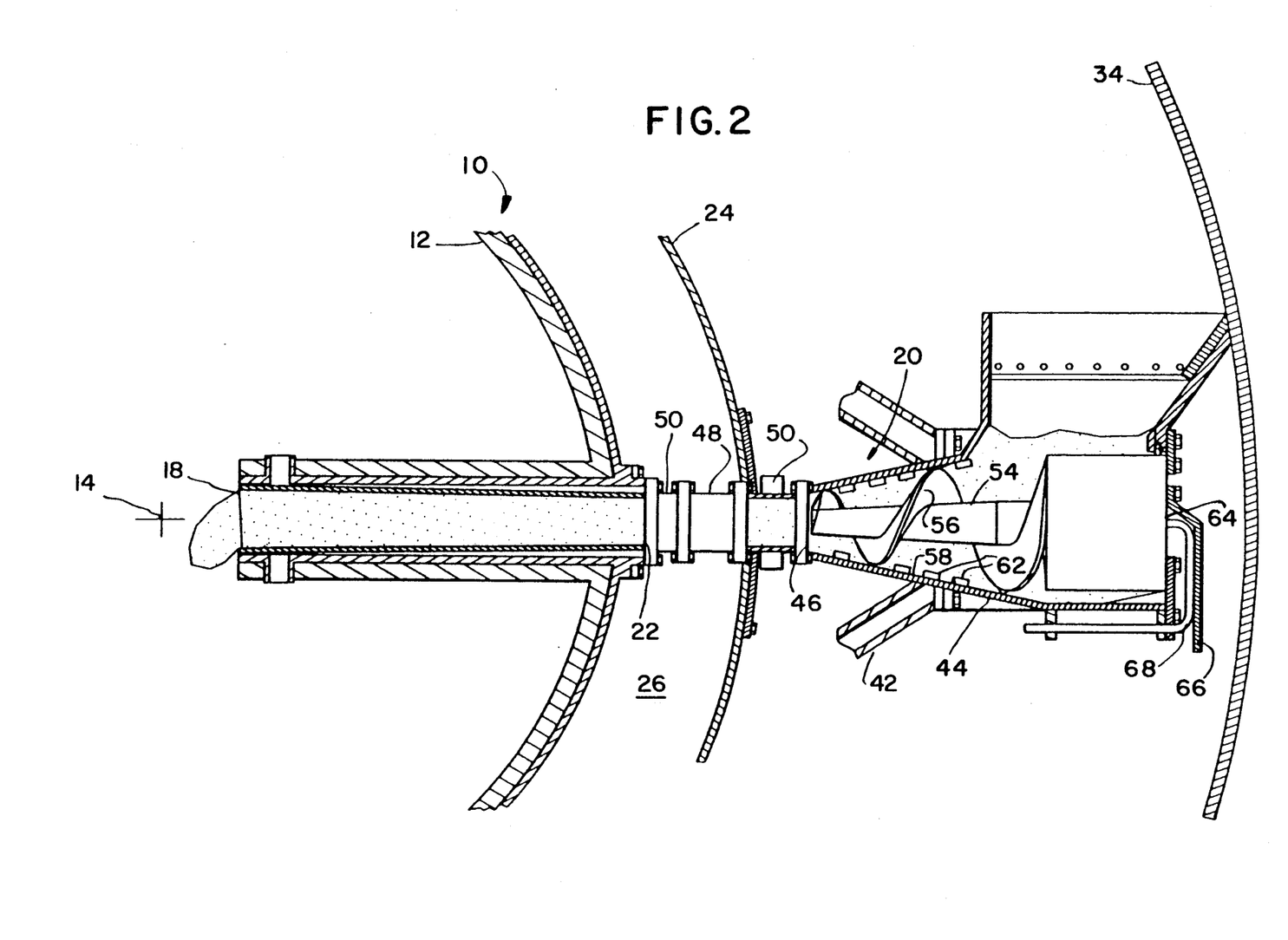
FIG. 2 is a detail sectional view of the preferred form of screw feeder of the present invention.

As best seen in FIG. 2, feed mechanism 20 is mounted on support cylinder 24 by appropriate supporting structure 42 connected to feed mechanism housing 44. Discharge end 46 of feed mechanism 20 passes through support cylinder 24 and is connected to extrusion or discharge tube 16 carried by kiln by coupling 48. Gate 50 is interposed between inlet 22 of extrusion tube 16 and coupling 48. Thus, feed mechanism 20 may be disconnected from kiln 10 by closing gate 50 to close inlet 22 to tube 20 and activating coupling 48 so that it retracts from gate 50 and permits relative movement between kiln 10 and feed mechanism 20. Gate 50 and coupling 46 are preferably hydraulically actuated. A flow measuring device 52, if desired, to monitor the rate of low of feed material through tube 16 and into kiln 10 may be conveniently mounted adjacent discharge 46 of feed mechanism 20. Tapered screw or auger 54 is located within feeder housing 44 with flutes 56 of screw 54 coacting with tapered walls 58 of housing 44 converging toward outlet or discharge 46 to compact feed material and force it into and through coupling 48, gate 50 and extrusion tube 20. The interior of the tapered, generally conical, wall 58 of housing 44 is provided with shredding bars 62 to shred the feed material between the periphery of screw flutes 56 and bars 62 in the event shredding is desirable. Power source or head 64, preferably hydraulic, for driving the screw 54 is located within feeder housing 44. Protective covers or shrouds 66 are provided to protect hydraulic lines 68 from contamination or damage as the feed mechanism rotates in stationary transfer drum 34. Power supply or hydraulic lines 68 are connected to the power or hydraulic unit located in space 38 and mounted on support cylinder 24 or kiln 10, as the case may be.

Figure 3:
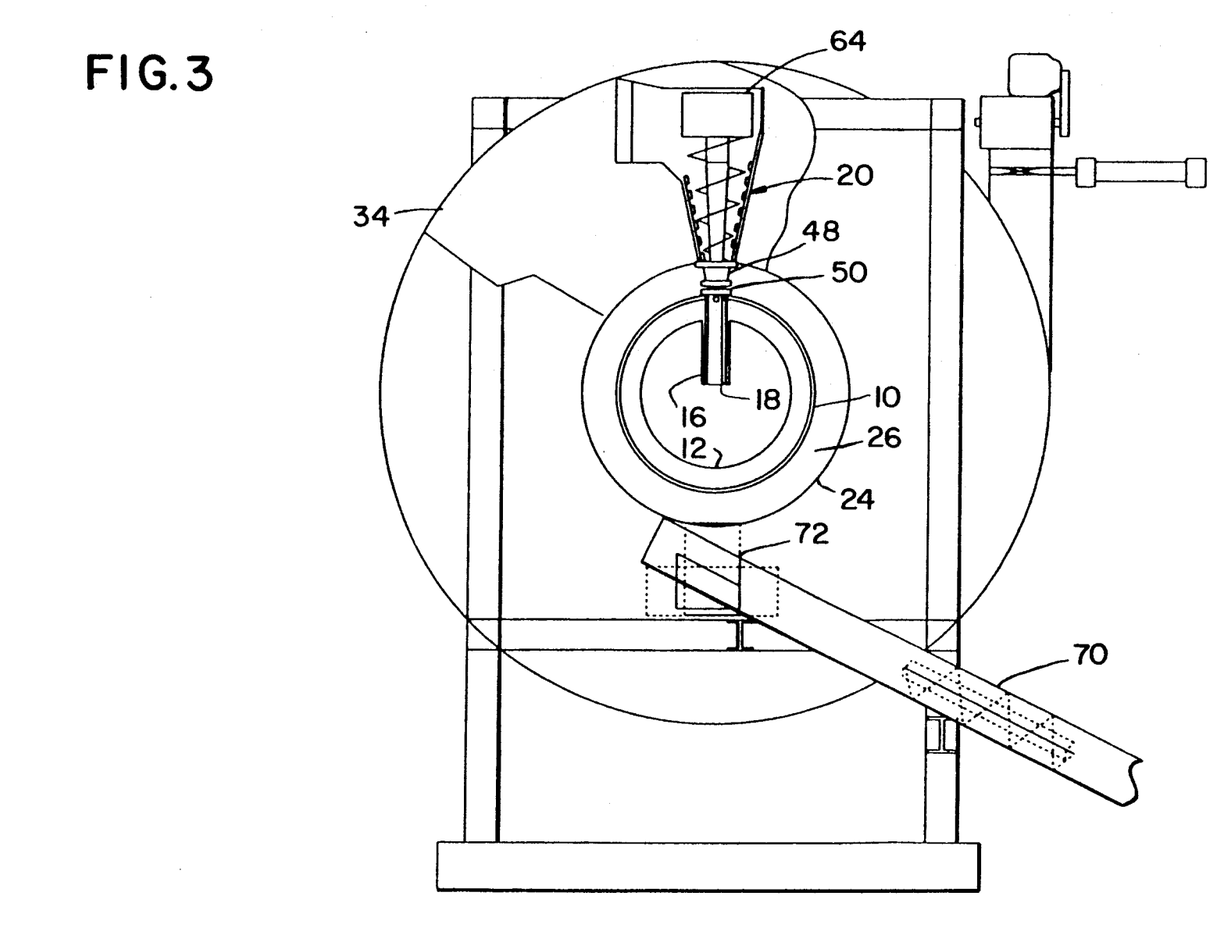
FIG. 3 is a transverse sectional view of the rotary cement kiln having the improved fuel feeding system of the present invention.

Material is delivered to the interior of transfer drum 34 by conveyor 70 which discharges into chute 72 which communicates with the interior of drum 34. Since drum 34 is stationary, the fuel material delivered through chute 72 collects in the lower interior of drum 34. The rotation of feeding apparatus 20 causes its inlet chute 74 to pass through the material in the lower interior of drum 34 and such material is collected in chute 74 and delivered to screw 54 so that it will be compressed and forced into the interior of kiln 10 through tube 16. Tube 16 is located at a position in kiln 10 which is between its two ends but sufficiently close to the material inlet so that the heat it provides substantially lessens the fuel requirements of the burner which normally is fired at the opposite end of kiln 10. Shredded material may also be delivered to transfer drum 34 by belt conveyor 76 which feeds vertical chute 78 and flow into drum 34 is controlled by air lock door 80. A suitable closure (not shown) is also provided for chute 72. The shredded material delivered through vertical chute 78 is picked up by inlet chute 74 and delivered as described above. The material delivered by conveyor 70 and chute 72 may be material which has not been shredded and which can be shredded by feed mechanism 20 as described above.

Material intended to be fed into the kiln is first metered into the transfer drum at any desired feed rate. The screw feeder is equipped with an inlet chute that travels around the circumference of the transfer drum as the kiln rotates. As a result of this arrangement, material is transferred or "scooped" from the transfer drum into the inlet chute as the screw feeder rotates through the lower portion of its travel. Inlet chute is sized to provide a continuous supply of fuel material to the screw feeder.

As shown and previously described herein generally the screw feeder is both a shredder and a continuous feed device. It is essentially a tapered screw auger that is powered by a variable speed hydraulic drive mounted at the large end of the screw. A metal cylinder having screw conveyor flighting covers the hydraulic drive unit. This cylinder is connected to the tapered screw auger so that the entire assembly rotates as one unit. The inlet chute to the screw feeder is positioned at the end of the unit above the hydraulic drive unit and conveyor flighting. The conveyor flighting covering the hydraulic unit has an extreme pitch so that very little rotation is required to quickly push material into the main screw auger. This feature allows the screw feeder to "eat" its way through waste material at the bottom of the transfer drum and to quickly transfer it into the feeder. This arrangement also allows the processing of viscous or sticky material that would otherwise cause handling problems. Three sides of the inlet chute are furnished with replaceable and adjustable wear strips so that clearances to the transfer drum can be controlled.

The main screw auger is tapered and it also contains teeth on the extreme end of its flights to grab and tear material. The main screw revolves inside a conical shaped section that contains stationary breaker bars around the inside perimeter of the housing. In this way, material is shredded and torn as it becomes lodged between the revolving screw teeth and the stationary breaker bars. Also, the conical screw chamber functions as a storage section for the feed material and enables the intermittent pick-up of the feeder to be converted to a continuous feed system. The storage cone can hold enough material to feed the kiln for as much as 10 revolutions without the need for additional supply. The clearance between the screw auger and its housing will be close at the entering and exit ends and wide in the mid section. Narrow clearance at the exit end will insure a positive, no slip thrust of material down the extrusion tube. Narrow clearance at the entrance end (for one revolution of the screw) will ensure that material does not fall out of the feeder when it is inverted. The wide clearance in between these two zones will function as the storage section where material is continuously shred, recirculated, and mixed until it is fed into the extrusion tube. Finally, a wide clearance at the end screw section in front of the inlet chute will quickly convey material into the storage section without attempting to shred it. A very fine particle size results by the time the material enters the kiln. The shredding feature is not essential to the successful operation of the feed system, but it broadens the range of materials that can be fed and it produces a finer particle size to promote efficient combustion.

As the main screw auger rotates, it simultaneously conveys material towards the center of the kiln through a flared extrusion tube. The screw stops at the smaller end of the conical housing but it has the power to push a plug of material down the length of the extrusion tube and into the kiln. An electromechanical flow meter can be used to measure the volumetric flow rate of material into the kiln. The speed of the screw auger rotation can be varied to yield any desired flow rate. The feed unit control system is self regulating and is capable of responding to any input rate into the transfer drum. The on-board control system senses whether any spillage of material occurs from the screw feeder inlet chute while the unit is in the downward portion of its revolution after passing the top center position. A load cell simply senses the spillage of material onto a flat plate located in the inlet chute at a certain point in the screw feeder's revolution about the kiln. If spillage occurs, then the feed rate is too slow, and the system will incrementally speed the screw RPM. If no spillage is detected, then the feed rate is too fast, and the system slows the screw feeder. By drifting across the point of spillage, the control system keeps the storage section of the screw feeder full at all times and any change in input rate to the transfer drum is automatically accommodated.

The extrusion tube is an annular pipe arrangement whereby solid material is pushed by the screw auger down the center, outwardly flared tube. The extrusion tube remains full of material at all times even if the storage cone in the screw feeder were to run dry. This creates a 7 to 8 foot long plug of material between the feed system and the internal temperatures of the kiln. This arrangement also enables the feed system to be separated from the kiln. A high pressure blower supplies variable volume combustion air into the kiln through the annular space surrounding the extrusion tube. The high flow rate of combustion air ensures that the solid plug remains cool until it is injected into the kiln. The combustion air travels at high velocities as it enters the kiln and it is deflected to impinge upon the solid fuel being extruded. This arrangement disperses the finely ground solids as they enter the kiln and autoignite, and it provides ideal mixing of fuel and air to promote efficient combustion. The extrusion tube is constructed of high temperature grade alloy and is further lined with refractory for thermal protection even when the feeding system is not in use. The extrusion tube extends into the kiln a minimum of 3 to 4 feet so that mineral contents of the kiln cannot spill into the tube as it rotates. A hydraulically operated knife gate is provided to isolate the kiln from the feeding system when desired. The knife gate is capable of cutting through the solid material traveling down the extrusion tube. It will automatically close via accumulator pressure should the hydraulic power unit fail. This same knife gate arrangement is supplied on the feeder side of the docking mechanism so that both sides of the feeding system can be isolated when uncoupling from the kiln. The knife gates engage against one another so that there is no loss of material when the feed system is disconnected from the kiln. In lieu of combustion air, the annular area surrounding the extrusion tube can also serve as a cooling jacket by circulating cooling fluid through the cavity, but this arrangement is not preferred.

The screw feeder can be mounted directly upon the rotating kiln cylinder provided it has sufficient strength to support the equipment weight. The preferred arrangement of the system; however, utilizes a separate and independent support system for the feeding unit. This system is composed of a support cylinder that is 2 to 4 feet larger in diameter than the kiln, which is supported by its own system of bearings and trunnions. The resulting arrangement allows the support cylinder to revolve around the kiln on the same center line and to simultaneously bear the weight of the feed system. The support cylinder is constructed of structural steel with an open framework so that the kiln shell can be viewed as much as possible and the weight of the support cylinder can be minimized. The support cylinder is covered with metal plate in the area where it overlaps the transfer drum so that the transfer drum can be maintained air-tight and it can be further cooled through the use of insulation under the shell. The support cylinder can be driven by the kiln drive through a hydraulically operated shear pin and latching mechanism. A docking mechanism mates the screw feeder to the extrusion tube and combustion air supply.

The docking mechanism can withstand angular movements of +/−10 degrees and radial movements of +/−1.5 inches so that any movement of the kiln relative to the feeder can be tolerated. With this arrangement, the feed system can be isolated from the kiln for maintenance, etc. without affecting operation of the kiln. Also, in the event of a stressing situation, the support cylinder drive pin will shear, the docking mechanism will simultaneously uncouple, and the knife gates will simultaneously close. The docking mechanism thus allows for natural movement of the kiln relative to the feed system but it also protects the survival and safety of the kiln as well. All seals and joints within the docking mechanism will be continuously purged with high temperature grade grease to insure that waste material does not enter the mechanism.

The transfer drum can be fed in two ways. A belt conveyor, drag conveyor, or bucket elevator can discharge direct feed items into the upper portion of the transfer drum whereby they fall vertically and come to rest at the bottom of the drum. The inlet chute of the screw feeder captures the material during the bottom sweep of its rotation. This option is preferred for items which are unshredded such as whole tires, lab pack containers, aerosol containers, medical waste, etc. The second method of feeding the device is through the use of a screw conveyor which discharges into the bottom section of the transfer drum. This option is preferred for materials which have been preshredded or else can be easily handled by a screw conveyor. In both cases, it is important that the material be metered into the transfer drum at the desired kiln feed rate. Equilibrium between the transfer drum feeding conveyor and the rotating screw feeder will automatically be established by the on-board control system for the feed screw. The transfer drum can be fed from a number of sources simultaneously to produce any desired material blend.

Figure 4:
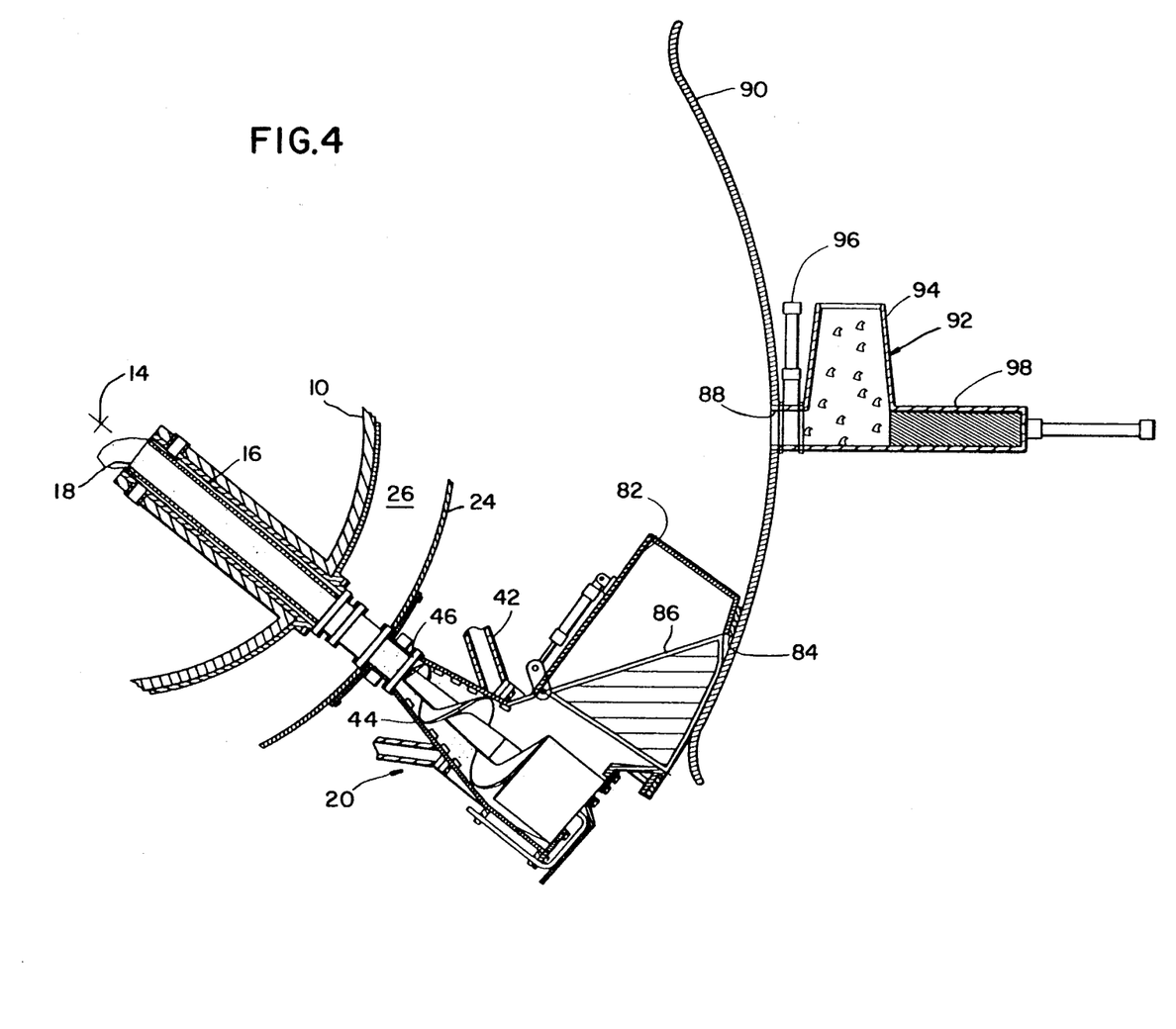
FIG. 4 is a partial sectional view of a modified form of feeding apparatus illustrating the rotating screw feeder approaching the loading station.
Figure 5:
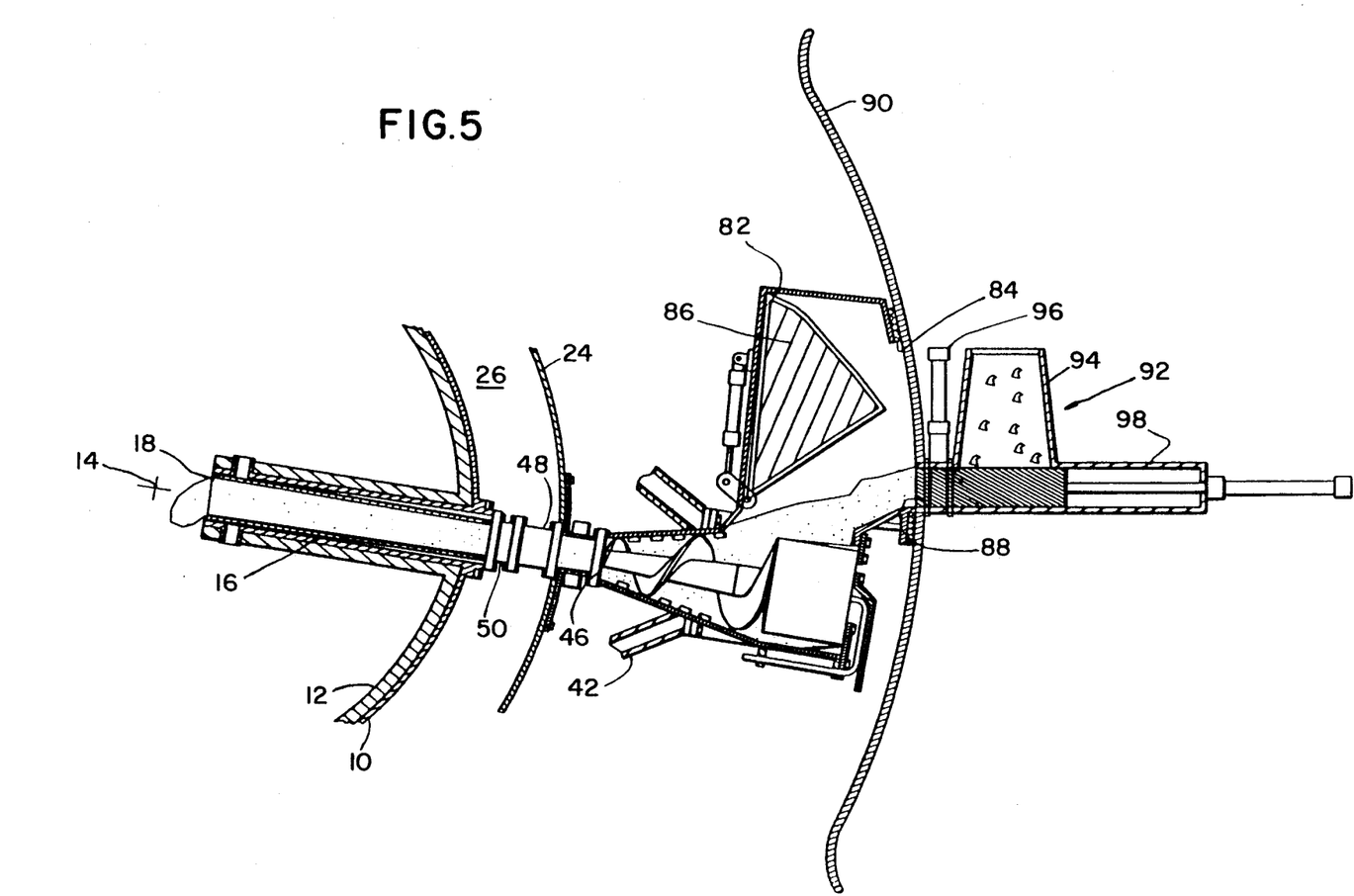
FIG. 5 is another partial sectional view of the modified form of feeding apparatus shown in FIG. 4 but with the rotating screw feeder in the loading position.
Figure 6:
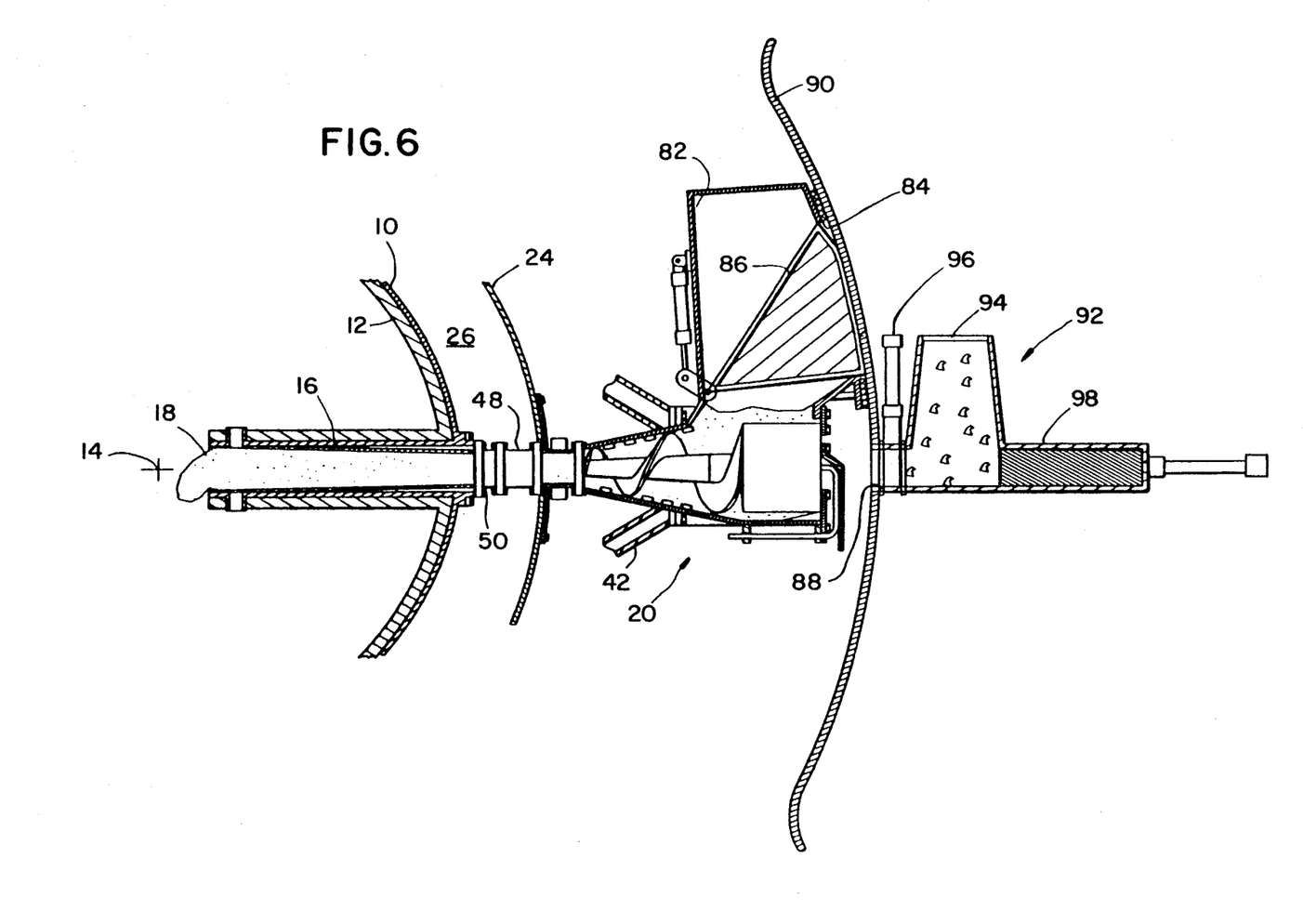
FIG. 6 is another partial sectional view of the modified form of feeding apparatus shown in FIGS. 4 and 5 but with the rotating screw feeder having moved past the loading station.

Alternate transfer means is shown in FIGS. 4, 5 and 6 and in such drawings parts which are the same as shown in and described in reference to the structure shown in FIGS. 1, 2 and 3 have been given the same numerical designation. Feeder inlet chamber 82 has been modified to include side opening 84 which is maintained adjacent the interior of drum 34 and has door 86 which closes opening 84 until such time as opening 84 is in registry with inlet opening 88 in drum 34. Door 86 provides an air lock and is only opened after sealing is established against seal face 90. Immediately on the exterior of drum 34 and seal face 90 is injection feeding means 92. Suitable means 92 includes a feed hopper 94, knife gate 96 and hydraulic ram 98 which forces material collecting in the lower portion of hopper 94 whenever gate 96 is opened. Gate 96 is opened only when opening 84 of feeder inlet chamber 82 is in registry with inlet opening 88 in drum 34 and seal face 90. This feeding action is clearly shown in FIGS. 4, 5 and 6 showing that door 86 only opens when sealing is provided against seal face 90 and ram 98 forces material into chamber 82 each time feed mechanism 20 passes inlet opening 88 in drum 34 and seal face 90.

In operation as the kiln rotates, the screw feeder inlet chute reaches a point where it is in contact with the stationary seal face on all sides of the opening. At this point the air lock door begins to open. The knife gate to the injection chamber opens as the inlet chute nears alignment with the chamber.

The injection ram begins to actuate once the inlet chute has cleared the chamber. The ram travels full stroke before the inlet opening passes. The ram stops momentarily at the end of its stroke so that a doctor blade mounted in the inlet chute can scrape the face of the ram clean before it retracts. The ram then retracts to its home position and feed material begins to accumulate in the injection chamber once again. The injection chamber knife gate also closes as soon as the ram begins to retract.

After the inlet chute passes the injection chamber, the air lock door begins to close. As it closes, the bottom of the assembly pushes any loose material into the feed screw. The front face of the air lock door is protected from direct contact with feed material by design. In this way it has no problem closing to within one inch of the stationary seal face. The air lock door is completely closed before it leaves engagement with the stationary sea face.

Figure 7:
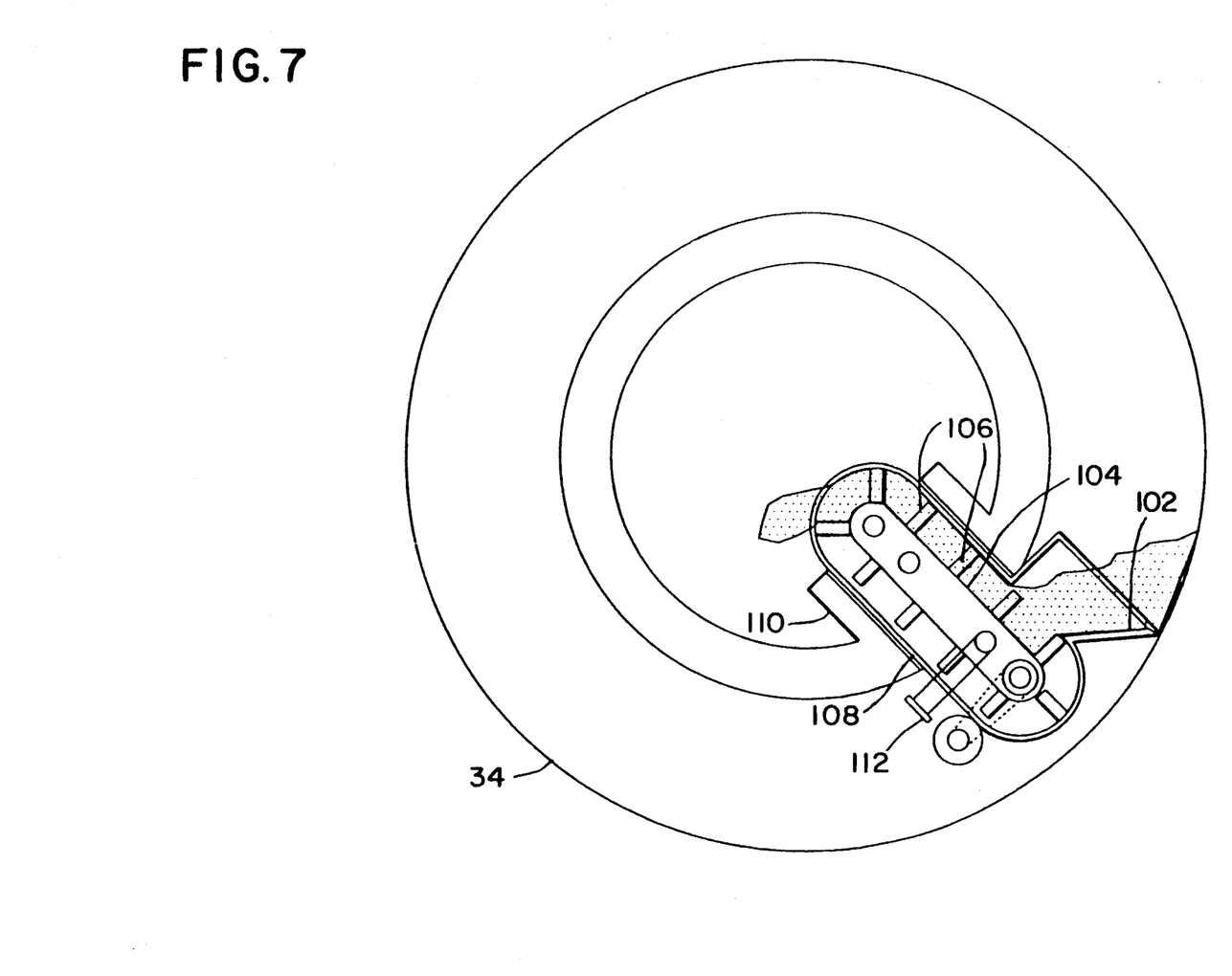
FIG. 7 is a partial sectional view of another modified form of rotating feeding apparatus.

Another modified form of feeding means for delivering the material to the central portion of kiln 10 is shown in FIG. 7 which includes feeding mechanism 100 having inlet chute 102 which rides close to the interior of transfer drum 34 and delivers the material scooped therein to drag conveyor 104 having flights 106 which provide a seal against the interior of housing 108 of conveyor 104. Flights 106 are moved continuously and in doing so discharge the material to the central portion of kiln 10. Suitable refractory material 110 is provided to protect the portion of the conveyor 104 which is within kiln 10 and combustion air inlet 112 is provided through housing 108 which both cools conveyor 104 and supplies the additional air for the combustion of the material once it is delivered into kiln 10.

Figure 8:
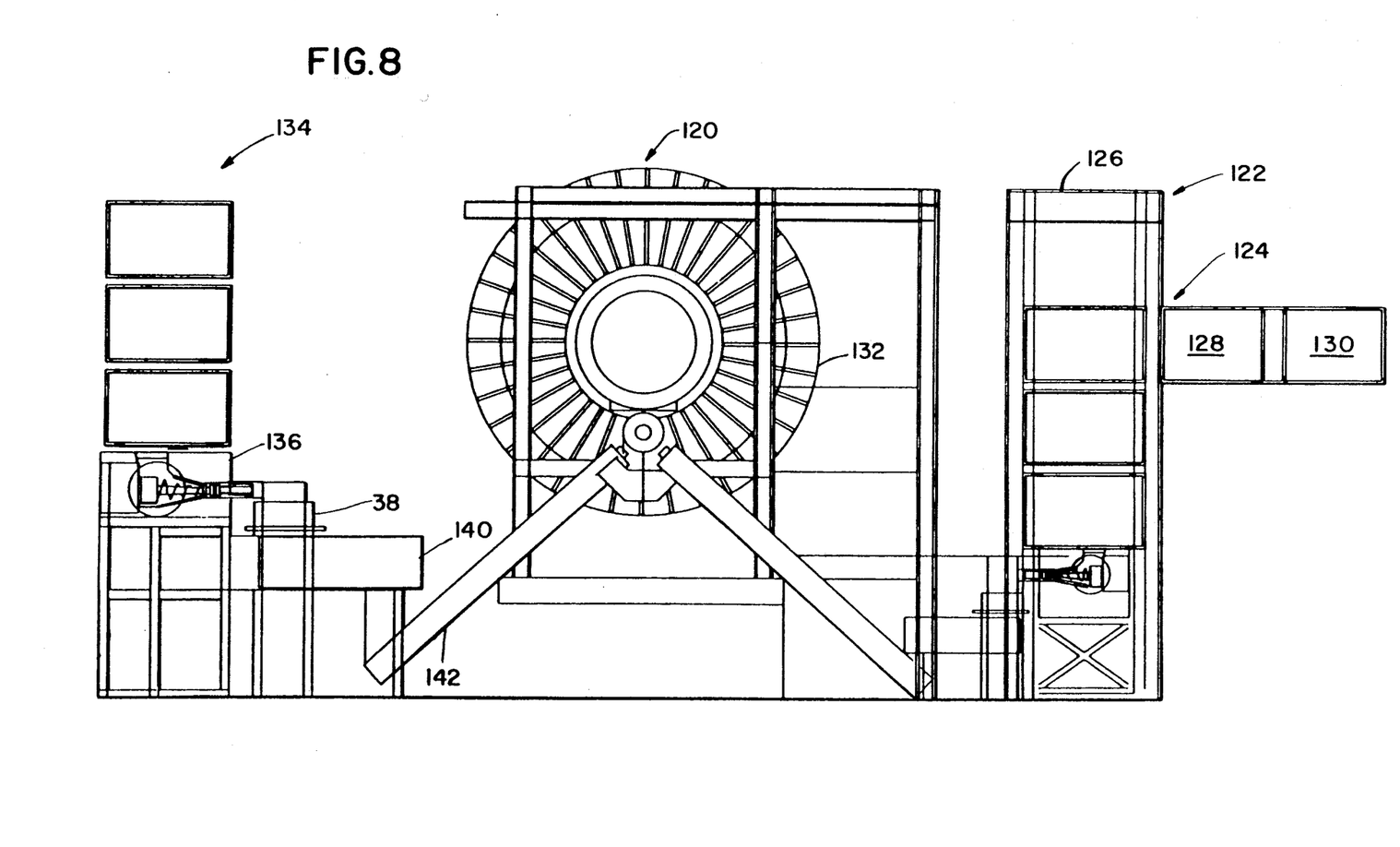
FIG. 8 is a schematic end view of the rotating kiln and showing two feeding systems for feeding hazardous waste material to rotating feeding apparatus and the rotating kiln while the waste material is maintained in an inert atmosphere and a second feeding system for the feeding of other material, such as tire derived fuel material, to the rotating kiln.

FIG. 8 discloses a complete system for feeding both a bulk fuel, such as shredded tire derived fuel and toxic waste materials to a typical cement kiln 120. Kiln 120 is substantially the same as kiln 10 and includes a similar rotating feed mechanism (not shown)which picks up material from the stationary transfer drum (not shown). Toxic waste material is delivered to the toxic waste processing section 122 in containers and is delivered through a sealing gate or air lock 124 into the upper portion of the feeding tower 126. Toxic waste material can be delivered to feed position 128 immediately outside air lock 124 and then forced into feeding tower 126 by ram 130 when it is needed and air lock is opened. Thereafter air lock 124 is closed and sealed and processing of the toxic waste material is conducted in a controlled environment, such as in a nitrogen atmosphere or other suitable atmosphere from which combustion air is excluded. The material is thereafter shredded in tower 126 and delivered to stationary drum 132 surrounding kiln 120. When using toxic materials it is best that they be confined so that no toxic gases or material may escape.

When non-toxic bulk material is to be used, it would be processed in processing section 134. The material would be dumped into a suitable hopper or feeding mechanism above shredder 136 or elevated from a bin (not shown) to shredder 136. Shredded material from shredder 136 may be combined with preshredded material and both are passed through continuous weighing system 138 to feed bin 140. Conveyor 142 delivers the shredded material from feed bin 140 to stationary drum 132 when it is picked up by the rotating screw feeding apparatus (not shown) to be fed directly into the interior of kiln 120.

A bulk feed bin provides a means of receiving truck load quantities of materials and delivering them to the kiln feed system at any operator selected feed rate. It is designed to provide consistent properties through continuous mixing and it also provides an uninterrupted feed even when being loaded. The feed bin has sufficient capacity to hold in excess of one truck load, it contains two horizontal rotating shafts with mixing paddles mounted in staggered fashion or else the shafts utilize a spiral of screw conveyor flighting for mixing. The shafts are hydraulically driven and are capable of reversing to clear any obstacle. The rotation of the shafts forces material towards the center of the bin and axially to provide for good intermixing of material. A large diameter inclined screw feeder carries material from the bin and discharges it into a shear shredder. The rotating bin shafts continuously mix the bin contents and provide a positive feed of material to the screw feeder. The screw feeder contains a reserve of material so that the feed bin can be opened and recharged with material without interrupting the feed cycle to the kiln. It is also large enough to easily convey shredded drum metal and other difficult to handle items.

The shear shredder guarantees a manageable particle size for downstream equipment and it also further reduces material size to produce favorable handling and burning conditions down stream. The shredder discharges upon an enclosed, side walled belt conveyor which contains a continuous weigh system. A controller receives the weigh signal from the belt scales and controls the screw feeder speed to yield the desired material feed rate. The belt conveyor discharges into the conveyor which carries material to the kiln feed system.

The kiln operator selects the desired feed rate of material and the control system deliverer that rate to the kiln feed unit. The kiln feed unit is self regulating and will adjust its feed rate to match whatever rate is delivered to the transfer drum.

The feed bin contains two hydraulically operated doors which close to allow inerting prior to the start-up of the unit. The bin doors also stop emissions when closed. If necessary, the bin can be equipped with an activated carbon emission control system to capture fumes which result when the doors are opened. Also, the feed bin is inerted with carbon dioxide which is heavier than air. In this manner, the bin contents are inerted even when the bin doors are opened. This means that it will be safe to open the bin doors and deposit additional material without loosing the inert blanket. Operation of the screw feeder can thus continue safely. The bin mixing system operates continuously during the feed cycle to the kiln so that consistent properties of feed material are insured. To handle over-pressurization, the bin is vented to the front end of the kiln through a conservation vent and detonation arrestor. The feed bin will be equipped with a separate fire suppression system utilizing halon, carbon dioxide, or foam. Also, the bulk feeding system will be equipped with isolation doors between the feed screw and the shear shredder; between the belt conveyor and the transfer drum feed screw; and between the feed screw and the transfer drum itself. All of the doors will close automatically in the event of fire, but they can be closed individually to isolate equipment for maintenance or inspection. Oxygen monitors will detect unacceptable levels of oxygen and introduce inert gas to displace the oxygen to acceptable levels. The temperature of the material in the feed bin will also be closely monitored to detect any unusual temperature rises due to chemical reactions or fire.

The bulk feed system can easily serve as a complete processing system by introducing feeding and shredding equipment prior to the feed bin. In this way both drum waste and bulk (truck load quantities of loose material) waste can be processed for feeding into the kiln without the need for outside facilities to preprocess the waste.

The shredding equipment for the toxic waste processing is preferred to be composed of a dual augured machine which is capable of accepting large materials such as stumps and drums and reducing them to small particle size in one shredding step. On top of the shredding equipment is located an air lock enclosure which has two points of entry. The first point of entry is reserved for drummed material and the other is reserved for bulk.

Drums to be processed are first lifted by an elevator to the air lock level. The drum air lock is composed of a chamber having an outer door and an inner door. The inner door connects the drum air lock to the shredder air lock and the outer door enables drums to enter the drum chamber. In operation, the outer air lock door opens and 4 to 12 drums are conveyed into the chamber. Then, the outer door closes and the chamber is blanketed with inert gas. When the oxygen content is sufficiently low, the inner door opens and the drums are conveyed through the shredder air lock where they all fall into the shredder. The inner drum air lock door closes before the outer door can open so that the shredder chamber is never exposed to the atmosphere.

The bulk feeding system operates in the same fashion as the drum system in terms of air lock function but a bulk feed bin is used to convey material into the shredding chamber. The bulk feed bin is motivated vertically so that a truck can dump into it and then the bin can be elevated to the shredder air lock elevation for feeding. The feed bin is equipped with two hydraulically operated doors which open to accept a load of material. Afterwards, they close and the bin is inerted. The end of the feed bin opposite the shredding air lock is equipped with a hydraulic ram which pushes the waste material horizontally out of the bin into the shredding chamber. An air lock door is located on the shredding side of the feed bin. A mating air lock door is located on the shredder air lock. After the feed bin is elevated to the air lock level, it is moved horizontally into the shredder air lock housing where it engages seals on all sides of the housing. Afterwards, both the shredder air lock door and the feed bin air lock doors open. The hydraulic ram on the feed bin then pushes the contents into the shredding chamber at a rate satisfactory to the shredding equipment operation. When the feed bin is empty, the shredding chamber air lock door closes first while the feed ram is in its extended position. With this arrangement, the feed ram is wiped clean by the air lock door before it closes. Afterwards, the feed bin air lock door closes and the unit is ready to be lowered to start another cycle.

The entire processing system may be blanketed with inert gas (such as carbon dioxide, nitrogen, or stack gas) through an oxygen monitoring and control system. In addition, the temperature inside the unit may be monitored for unexpected temperature rises due to chemical reactions or fire. The unit may also be provided with a self activating fire suppression system utilizing halon, carbon dioxide, or foam. A liquid carbon dioxide system may be preferred because it has the ability to instantaneously cool a run away chemical reaction. The processing system, drum air lock, and bulk feed bin are vented to the kiln through a conservation vent and detonation arrestor so that over-pressurizations and gas displacements can be vented through the kiln primary burner. Finally, air lock enclosures may be furnished with explosion hatches to relieve emergency pressures. A video camera may be mounted in the shredder air lock so that feeding rates to the shredder can be monitored and adjusted by the operator.

The processing system can be used in conjunction with a second processing system or preshred feed bin to provide two or more simultaneous feeds to the kiln feeding system. This simultaneous feed can produce many benefits. For example, a preshred feed bin feeding tire derived fuel (or any material having consistent heating value properties) used in conjunction with a processing system feeding hazardous waste would have the combined ability to provide a constant Btu input into the kiln. The Btu value of tire derived fuel averages 15,000 Btus per pound and the feed rate of such material could be varied to level any Btu fluctuations that occur from the hazardous waste processing system. This means that even contaminated soil having virtually no Btu value can be successfully utilized by the kiln when fed simultaneously with tire derived fuel. The USEPA Boiler and Industrial Furnace regulations require that an automatic waste feed cut-off system must be activated if the kiln stack discharge limits are exceeded. An additional benefit of this arrangement is to guarantee an uninterrupted feed of fuel into the kiln even if the automatic waste feed cut off of the hazardous waste system occurs. In this case, the feed rate of tire derived fuel would simply increase to make up for any loss of fuel from the hazardous waste processing system. The net result of this simultaneous feed is to produce stable and consistent feed conditions even if the properties of the materials vary. The range of materials that can be utilized by the kiln is significantly broadened by this simultaneous feeding arrangement.

What is claimed is:

1. An apparatus for feeding materials to the interior of a rotary apparatus at a point intermediate its ends comprising
- a rotary cylinder,
- a feeding means having a discharge end,
- means for mounting said feeding means for rotation with said rotary cylinder with its discharge end within said rotary cylinder,
- a stationary transfer means associated with said feeding means,
- rotation of said feeding means with respect to said transfer means delivering material from within said transfer means to said feeding means, and
- means driving said feeding means to feed said material through its discharge end into said rotary cylinder.

2. An apparatus according to claim 1 wherein
- said rotary cylinder is a rotary kiln, and
- said feeding means is a screw feeding apparatus having a discharge tube for its discharge end.

3. An apparatus according to claim 2 wherein said mounting means includes
- a support cylinder mounted in surrounding relationship to said rotary cylinder for rotation therewith, and
- means on said support cylinder for supporting said screw feeding apparatus.

4. An apparatus according to claim 1 including
- means for flowing cooling air around said feeding means discharge end and into said rotary cylinder to cool said discharge end and to provide combustion air in said cylinder.

5. An apparatus according to claim 2 wherein
- said screw feeding apparatus includes means for shredding material fed therethrough.

6. An apparatus according to claim 2 including
- means for metering material flowing through said discharge tube of said screw feeding apparatus.

7. An apparatus according to claim 2 including
- a docking mechanism connecting between the portion of the discharge tube within said rotating cylinder and the portion of the screw feeding apparatus extending into said stationary transfer means.

8. An apparatus according to claim 1 wherein
- said rotating cylinder is a cement kiln.

9. An apparatus according to claim 3 including
- a layer of insulation material within said rotary cylinder, and
- means for flowing cooling air between said rotating cylinder and said support cylinder.

10. An apparatus according to claim 1 including
- means for delivering material to said stationary transfer means.

11. An apparatus according to claim 10 wherein said delivering means includes
- a conveyor for delivering bulk material to said stationary transfer means.

12. An apparatus according to claim 10 wherein said delivering means includes
- means for delivering material to said feeding means under a nitrogen atmosphere.

13. An apparatus according to claim 12 including
- means for delivering bulk material to said feeding means.

14. An apparatus according to claim 1 wherein
- said rotary cylinder is a cement kiln, and
- said materials are waste materials fed to the calcining zone of said cement kiln.

15. An apparatus according to claim 14 including
- means combining materials having a substantially consistent heating value with said waste materials for feeding to said calcining zone of said cement kiln.

16. The apparatus according to claim 1 wherein
- said transfer means is a stationary drum having an inlet for material to be delivered into the drum,
- said feeding means rotates within said stationary drum and includes a chute for collecting material from the drum and delivering it to said rotary cylinder.

17. The apparatus according to claim 1 wherein said transfer means includes
- a stationary arcuate plate, and
- a material delivering means which delivers material through said plate as said feeding means passes said plate in sealing engagement therewith.

18. The apparatus according to claim 17 wherein
- said material delivering means is a ram.

19. An apparatus according to claim 17 including
- means associated with said material delivering means to maintain the material handled by the material delivering means under an inert atmosphere.

20. An apparatus for delivering material to the interior of a rotary kiln comprising
- a support cylinder mounted around a portion of the length of the exterior of the rotary kiln,
- means for connecting said support cylinder to said kiln for rotation therewith,
- a transfer drum surrounding the support cylinder,
- means supporting the transfer drum to render it stationary with respect to the kiln and support cylinder,
- a feeding mechanism positioned within said transfer drum,
- means connecting the feeding mechanism to said kiln for rotation therewith,
- means for delivering material to the interior of said transfer drum,
- a discharge end on said feeding mechanism communicating with the interior of said kiln, and
- means connecting said feeding mechanism to said discharge end for delivering material from said feeding mechanism through said discharge end to the interior of said kiln,
- said feeding mechanism having means for collecting material delivered to said transfer drum and feeding it to said discharge end.

21. A method of delivering substantially continuously into the central portion of a rotating cylinder including the steps of
- providing a stationary collection of material to be delivered into the rotating cylinder,
- connecting a feeding apparatus to rotate with said rotating cylinder and during rotation to gather material from said stationary collection of material, and
- continuously feeding the material through said feeding apparatus as a plug therein extending across the entire interior of the feeding apparatus into the interior of said rotating cylinder.

22. A method of delivering material substantially continuously into the central portion of a rotating cylinder according to claim 21 including the steps of
- the rotation of the feeding apparatus causes it to scoop up the material in said stationary collection of material.

23. The method of claim 21 wherein said rotating cylinder is a furnace device and said feeding apparatus is a screw feeding apparatus.

24. The method of claim 21 wherein said rotating cylinder is a rotary cement kiln.

25. The method of claim 21 including the steps of compressing the material in a plug before discharge into the interior of said rotating cylinder.

26. The method of claim 21 including the step of injecting said material from said stationary collection directly into said feeding apparatus.

27. The method according to claim 26 wherein said injection step is performed by a ram device.

28. The method according to claim 26 including the step of
maintaining an inert atmosphere around said material at said stationary collection.

29. The method according to claim 24 including the steps of
delivering a material having a substantially consistent heating value to said stationary collection, and
delivering a waste material to said stationary collection whereby both are materials are burned to add to the heat supplied to said rotating cylinder.

30. The method according to claim 23 including the steps of
delivering a first material to said stationary collection which first material has a know heating valve, and
delivering a second material to said stationary collection which second material has a heating value which is not desirable for delivery to said furnace device without the addition of said first material.

31. The method according to claim 30 including the step of
controlling the amounts of each of said first and second materials to said stationary collection so that said materials when burned provide the desired amount of heating to the interior of said rotating cylinder.

32. The method according to claim 23 including the step of
shredding the material in said screw feeding apparatus during its movement therethrough.

33. The method according to claim 21 including the step of
providing a support cylinder around the exterior and spaced radially outward from the rotating cylinder which supports and rotates with said feeding apparatus.

34. The method according to claim 21 including the step of
flowing cooling air around the exterior of the feeding apparatus and into the rotating cylinder to cool the exterior of the feeding apparatus and to provide combustion air to the interior of the rotating cylinder.

35. The method according to claim 21 including the step of
metering the amount of material being fed into said rotating cylinder.

36. The method according to claim 21 including the steps of
receiving bulk materials, and
processing said bulk materials to provide a preselected size and blend of material for use in the rotary cylinder,
said processed bulk materials being delivered to the stationary collection.

37. The method of delivering material into the calcining portion of a rotating cement kiln including the steps of
delivering material to be introduced into the cement kiln to a stationary collection zone,
transferring the material from said stationary collection zone to a rotating feeding apparatus,
feeding the material through the rotating feeding apparatus, and
continuously discharging material from the rotating feeding apparatus as a plug therein extending across the entire interior of the feeding apparatus into the interior of the kiln at a position which is above the level of solids contained therein.

* * * * *